United States Patent [19]

Juds et al.

[11] Patent Number: 4,851,660

[45] Date of Patent: Jul. 25, 1989

[54] PHOTOELECTRIC COMPRESSED ANALOG SIGNAL STRENGTH INDICATOR

[75] Inventors: Scott M. Juds, Everett; Robert J. Jackson, Bothell, both of Wash.

[73] Assignee: Opcon, Inc., Everett, Wash.

[21] Appl. No.: 143,354

[22] Filed: Jan. 12, 1988

[51] Int. Cl.[4] .............................................. H01J 40/14
[52] U.S. Cl. ............................ 250/214 H; 250/214 L
[58] Field of Search .......... 250/214 A, 214 R, 214 L, 250/548, 557, 561; 307/311; 356/141, 152, 223–226, 400

[56] References Cited

U.S. PATENT DOCUMENTS

| | | | |
|---|---|---|---|
| 3,892,493 | 7/1975 | Pallingen et al. | 250/211 R |
| 3,895,876 | 7/1975 | Mori | 356/226 |
| 3,914,701 | 10/1975 | Burdick | 328/151 |
| 3,944,369 | 3/1976 | Cuthbert et al. | 356/398 |
| 4,096,382 | 6/1978 | Numata et al. | 250/214 A |
| 4,178,512 | 12/1979 | Frungel et al. | 250/461 R |
| 4,356,393 | 10/1982 | Fayfield | 250/214 R |
| 4,528,501 | 7/1985 | Dorrough et al. | 324/103 P |
| 4,648,135 | 3/1987 | Labrum et al. | 250/214 R |
| 4,674,870 | 6/1987 | Cain et al. | 356/152 |

*Primary Examiner*—David C. Nelms
*Assistant Examiner*—Stephone B. Allen
*Attorney, Agent, or Firm*—Christensen, O'Connor, Johnson & Kindness

[57] ABSTRACT

A compressed analog signal strength indicator that produces a light signal proportional in intensity to the relative alignment of an associated photoelectric transmitter and photoelectric receiver pair is disclosed. A sensor (10) detects a light signal (18) received from the associated photoelectric transmitter and produces an electrical signal. A nonlinear circuit (12) compresses the electrical signal and supplies an output to a peak hold circuit (13), which controls the current flow to an indicator (14). A threshold detection loop, which includes: a demodulator (15); an integrator (16); and, a comparator (17), senses the amplified signal of sensor (10) and produces a noticeable step increase in the brightness of the indicator (14) when the light signal (18) is first detected by the sensor (10).

18 Claims, 4 Drawing Sheets

PHOTOELECTRIC COMPRESSED ANALOG SIGNAL STRENGTH INDICATOR

TECHNICAL AREA

This invention relates to indicators and, more particularly, to photoelectric signal strength indicators.

BACKGROUND OF THE INVENTION

Use of photosensing systems in industry and other areas has become prevalent in recent years. Such systems include a photoelectric transmitter that projects a source of light (preferably a source of modulated light) and a photoelectric receiver for detecting the projected light. A photoelectric transmitter and photoelectric receiver pair may be mounted in the same housing or they may be mounted in separate housings that are spaced apart when in use. When the transmitter/receiver pair are mounted in the same housing, a diffuse reflecting, or retroreflective surface is used to redirect the source light from the transmitter to the receiver. When the transmitter and receiver pair are spaced apart, the source light usually impinges directly on the receiver. A step change, through the threshold detection level, in the amount of light impinging on the receiver creates control signal information used to control or communicate with various types of equipment. The change may be the interruption of a light beam caused by a passing object or the receipt of a light beam normally blocked by the presence of an object.

One requirement of photosensing systems is the need to properly align an associated transmitter and receiver pair when they are spaced apart or to properly align a retroreflective surface with the transmitter/receiver pair when the transmitter/receiver pair are mounted in the same housing. Proper alignment provides increased sensor immunity to dust and other environmental optical contaminants that degrade performance of photosensing systems over time.

In the past, efforts to align transmitter/receiver pairs have been hindered by the lack of an accurate apparatus for indicating precise alignment. Among other apparatus, the prior art has used multiple LEDs in the form of a bar graph attached to the sensors to indicate photosensor alignment. One disadvantage of such apparatus is that alignment indication is limited to the discrete steps provided by the number of LEDs used. Other disadvantages include the comparatively high expense of such apparatus and the bulk of such apparatus which makes their use impractical of miniature type sensors. Blinking LED systems, such as that disclosed in U.S. Pat. No. 4,356,393, wherein the LED blinking rate indicates the degree of alignment, have also been used by the prior art. Unfortunately, variations in LED blinking rates are difficult to visually perceive. Also, LED blinking is easily confused with sensor detection of passing objects. Additionally, prior art devices and apparatus have been plagued by the inability to respond to the broad dynamic range of light signals required as a result of their linear operating characteristics which limit perceptible indication over the broad dynamic range of signal strength. Linear indicating systems cannot show the 50:1, or higher, dynamic range of signal strength reception available with photosensing systems. It is relatively common to align a photoelectric sensor on the fringes of its sensing zone and not know that optimum sensor alignment for immunity to environmental contamination has not been achieved.

Therefore, as can be readily appreciated from the foregoing discussion, there is a need for an apparatus to assist in the accurate alignment of photosensing systems. The present invention is directed to providing such an apparatus, namely a low cost signal strength indicator suitable for use with miniature type photosensing systems that provides a visual indication of the degree of photosensor alignment and which also has the capability to respond to a broad dynamic range of inputs.

SUMMARY OF THE INVENTION

In accordance with this invention, a signal strength indicator is provided that is ideally suited for aligning photosensing systems. A light detecting photodetector is positioned to detect the light signals (which are preferably modulated light signals) from an associated phototransmitter that produces the modulated light signals. The photodetector produces an output that is linearly proportional to the strength of the detected light signals. A nonlinear circuit compresses the linearly amplified output of the light detecting photodetector and supplies the signal to a peak hold circuit. The voltage waveform produced by the peak hold circuit controls the current flowing to a light emitting diode (LED). The voltage waveform supplied by the peak hold circuit, causes the LED to emit light that varies proportionally with the voltage waveform and, hence, nonlinearly with respect to the strength of the detected light signals. As a result, the LED is responsive to a much broader range of light signals than would be the case if the output of the photodetector were only linearly amplified.

In accordance with further aspects of this invention, a threshold detection loop demodulates and integrates the linearly amplified output of the light detecting photodetector, and compares the integrated signal with a predetermined threshold value. Initially, the LED emits a low level light output indicating the circuit is energized. When the integrated signal exceeds the predetermined threshold value the LED produces a stepped increase in brightness (over the low level light output) indicating detection of the modulated light signals.

In accordance with other aspects of this invention, the nonlinear circuit is a logarithmic amplifier.

In accordance with alternative aspects of this invention, the nonlinear circuit is a piecewise-linear logarithmic approximation circuit that approximates the output characteristics of a logarithmic amplifier.

As will be readily appreciated from the foregoing summary, the invention provides a photoelectric compressed analog signal strength indicator that provides a light signal whose intensity varies, according to a nonlinear proportionality with the strength of the detected light signal.

BRIEF DESCRIPTION OF THE DRAWINGS

The foregoing and other features and advantages of this invention will become more readily appreciated as the same becomes better understood by reference to the following detailed description, and when taken in conjunction with the accompanying drawings, wherein.

DETAILED DESCRIPTION OF THE PREFERRED EMBODIMENT

Figure 1:
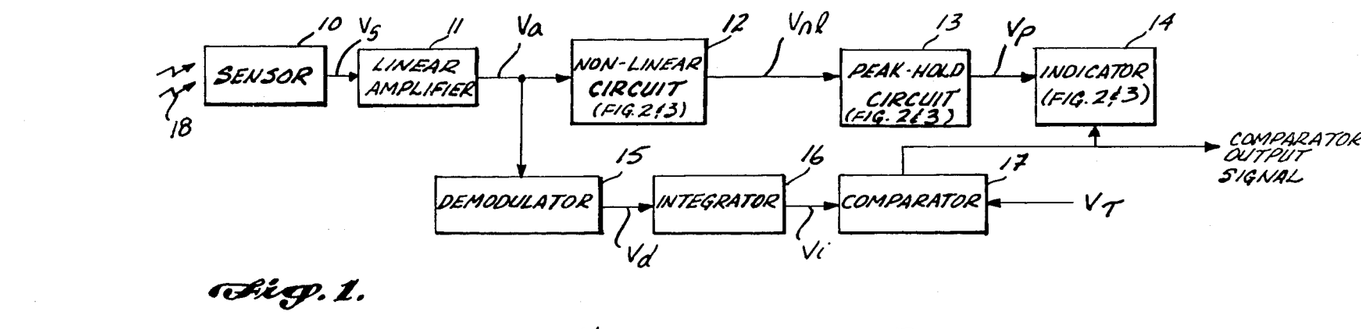
FIG. 1 is a block diagram of a photoelectric signal strength indicating system formed in accordance with this invention.
Figure 4:
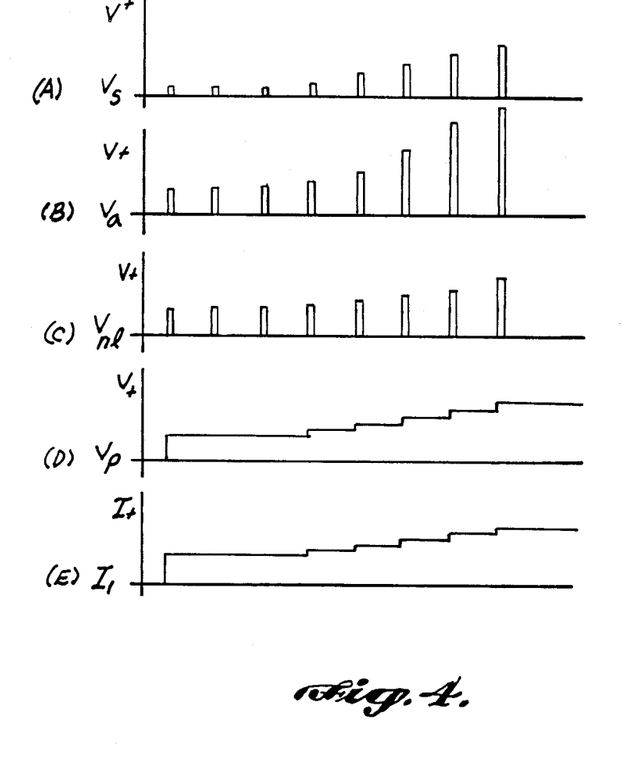

As is well known to those skilled on the photosensing art, there is a need for ensuring the accurate alignment of photosensing systems so that optimum sensing capabilities are achieved. This invention, shown in block diagram form in FIG. 1, provides a visual indication of the relative alignment of a photosensing system. More specifically, FIG. 1 illustrates a photoelectric compressed analog signal strength indicator in which a phototransmitter (not shown) produces a light signal 18 (which is preferably a modulated light signal) that is detected by a light detecting sensor 10, e.g., a photodetector. Upon sensing the modulated light signal 18, the sensor 10 converts the modulated light signal 18 into proportional electrical pulses, $V_s$, which are depicted in FIG. 4, line A. The strength of the sensed light signal 18 increases as the relative alignment between the sensor 10 and the associated phototransmitter improves. For example, as is well known to those skilled in the photosensing art, the phototransmitter produces the modulated light signal 18 in a beam pattern. When the center line of the beam pattern is aligned with the centerline of the sensor 10 such that the center of the beam of light signal 18 impinges upon the center of the sensor 10, the $V_s$ pulses produced by the sensor 10 have maximum amplitude. As a result, when the phototransmitter and sensor 10 are perfectly aligned, the sensor 10 produces maximum amplitude $V_s$ pulses. Contrariwise, when the phototransmitter and sensor are misaligned so that the light signal 18 does not impinge upon the sensor 10, sensor 10 will not produce $V_s$ pulses (i.e., $V_s$ pulses having zero amplitude). Between these two extremes, i.e., the maximum and zero values, $V_s$ pulse magnitude depends upon the relative alignment of the phototransmitter and the sensor 10. This relationship is further represented in FIG. 4, line A, where $V_s$ pulses moving from left to right have increasingly greater amplitude, representing increasingly improved alignment between the phototransmitter and the sensor 10.

Referring again to FIG. 1, a linear amplifier 11 is coupled to receive the $V_s$ pulses produced by the sensor 10 and, without changing their relative magnitudes, linearly amplifies $V_s$ pulses to produce amplified pulses, $V_a$. Thus, $V_a$ pulses are linearly proportional to the strength of the detected light signal 18. $V_a$ pulses are depicted in FIG. 4, line B. The $V_a$ pulses are fed to a nonlinear circuit 12 which, as will be discussed in greater detail below, nonlinearly compresses the amplitude of the $V_a$ pulses. Thus, nonlinear circuit 12 produces a series of compressed pulses, $V_{nl}$, which are nonlinearly proportional to $V_a$, and therefore, nonlinearly proportional to the strength of the detected light signal 18. These pulses, $V_{nl}$, are depicted in FIG. 4 on line C. A peakhold circuit 13 senses and holds the peak values of $V_{nl}$. The peak hold circuit 13 produces a peak voltage $V_p$, whose waveform is depicted in FIG. 4, line D. The peak voltage $V_p$ is applied to an indicator 14. The indicator 14 provides a light output whose brightness is proportional to $V_p$. Since $V_p$ represents the peak values of the compressed pulses, $V_{nl}$, the brightness of the indicator 14 is proportional to $V_{nl}$ and, hence, nonlinearly proportional to the strength of the detected light signal 18.

Figure 5:
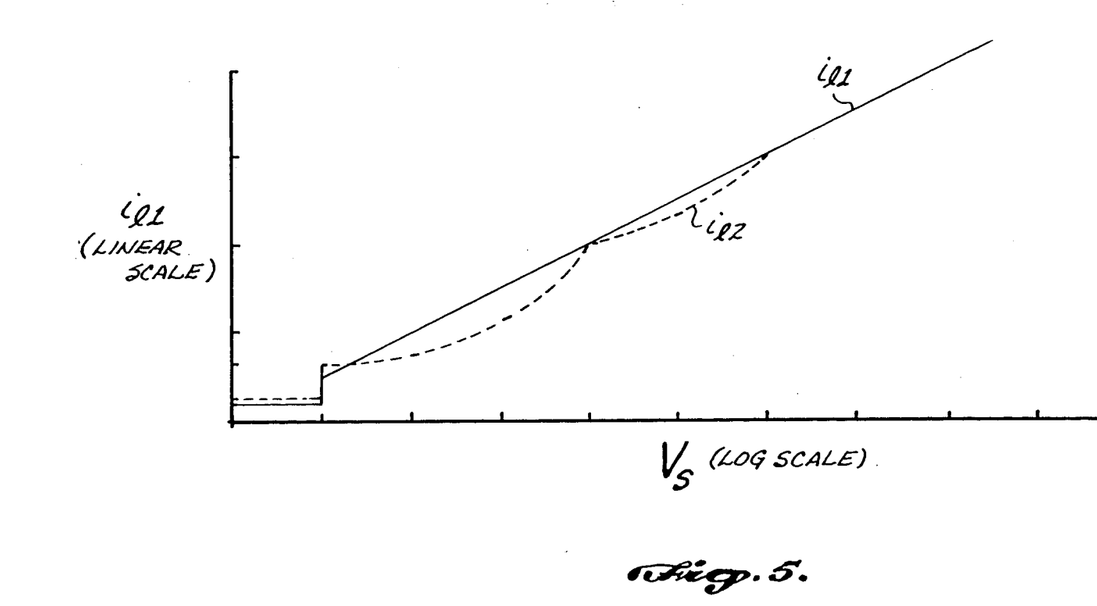
FIG. 5, is a graph representing the output characteristics of an indicator, namely an LED, suitable for use in the embodiment of this invention depicted in FIGS. 2 and 3.

A noticeable step in the brightness of the indicator 14 is produced by a threshold detection loop that provides increased current flow to the indicator 14 when the modulated light signal 18 is first detected. The threshold detection loop includes: a demodulator 15 connected to receive and demodulate the amplified pulses, $V_a$, produced by the linear amplifier 11; an integrator 16 that integrates the demodulated signal produced by the demodulator 15; and, a comparator 17 that compares the integrated signal produced by the integrator 16 with an externally supplied signal. More specifically, the demodulator 15 produces a demodulated signal, $V_d$, whose magnitude is controlled by the amplitude of the amplified pulses, $V_a$. Fluctuations in $V_d$ are removed by the integrator 16. The integrated voltage $V_i$ is compared in the comparator 17 with externally produced threshold voltage, $V_T$. When $V_i$ exceeds $V_T$, the comparator 17: produces an output signal; and, simultaneously applies a signal to the indicator 14, which results in a step increase in brightness. In a conventional manner, prior to the step increase, the indicator 14 is at a low-level or glowing operating condition, which indicates that power has been applied to the photosensing system. The increased brightness of indicator 14, resulting from $V_i$ exceeding the threshold voltage $V_T$, corresponds to the initial detection, by the sensor 10, of the modulated light signal 18 and is illustrated in FIG. 5 as a vertical step.

Figure 2:
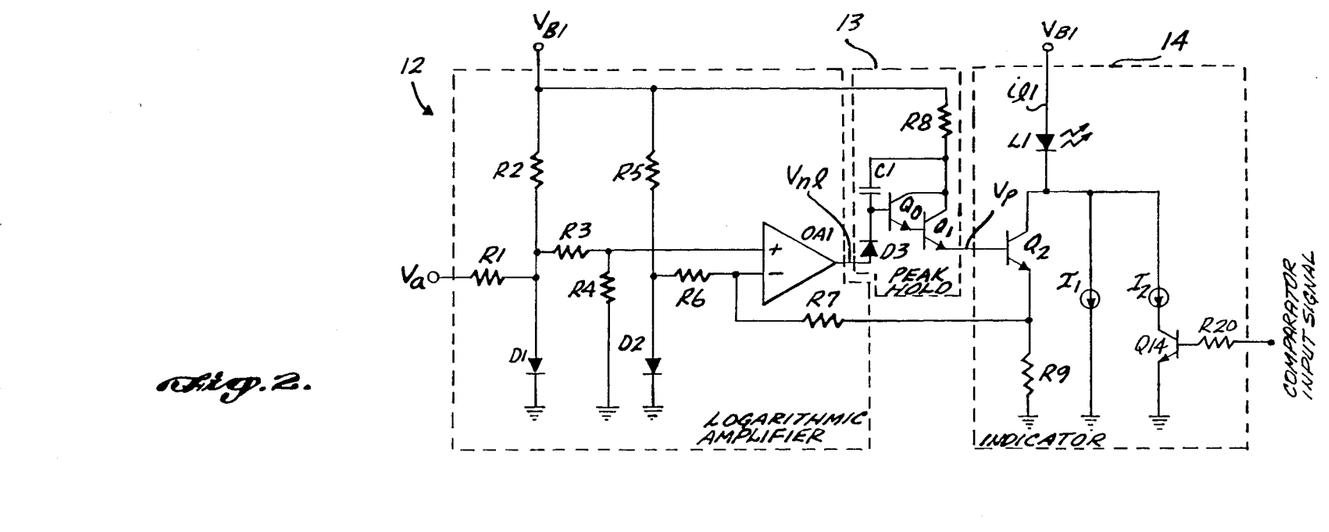
FIG. 2 is a schematic diagram of a nonlinear circuit, namely a logarithmic amplifier, and peak hold and indicator circuits suitable for use in the embodiment of the invention illustrated in FIG. 1.

As illustrated in FIG. 2, the nonlinear circuit 2 is preferably a logarithmic amplifier that comprises: an operational amplifier designated OA1; two diodes designated D1, and D2; and, seven resistors designated R1, R2, R3, R4, R5, R6 and R7. A detailed description of the logarithmic amplifier version of the nonlinear circuit 12 and its function is presented below.

The amplified pulses, $V_a$, produced by the linear amplifier 11 are applied to the logarithmic amplifier (FIG. 2) at R1, which is connected at its other end of the anode of D1. The cathode of D1 is tied to ground. R2 is connected between a voltage supply bus $V_{B1}$ and the anode of D1, and forward biases D1. As is well known to those skilled in the relevant art, the current flow through, and the resulting voltage drop across a diode, have a natural logarithmic relationship. Hence, the current flow changes through D1 caused by $V_a$ pulses create a logarithmically related voltage change at the anode of D1. R3 is connected between the anode of D1 and the noninverting input of OA1. R4 is connected between the noninverting input of OA1 and ground. R3 and R4 form a voltage divider circuit and are sized so as to properly scale the voltage applied to the noninverting input of OA1. R5 is connected between the voltage supply bus $V_B$ and the anode of D2, which has its cathode tied to ground. R6 is connected between the anode of D2 and the inverting input of OA1. R5 forward biases D2, which functions as a reference diode for D1.

OA1 amplifies the difference between the voltage supplied to its two input terminals. More specifically, the OA1 amplifies difference between the voltage drop across R4 and the reference voltage produced at the junction of D2, R5 and R6 modified by a negative feedback from the indicator 14 to OA1 applied to the inverting input of OA1 via R7 in the manner described below.

The output of OA1 is applied to the peak hold circuit 13, which comprises: a clipping diode designated D3; a capacitor designated C1; a resistor designated R8; and, two NPN transistors designated Q0 and Q1. More specifically, the output of OA1 is applied to the anode of D3 and the cathode of D3 is connected to the base of Q0. C1 is connected across the base of Q0 and the commonly connected collectors of Q0 and Q1. R8 is connected between the supply bus $V_{B1}$ and the collectors of Q0 and Q1. As will be readily appreciated by those skilled in the transistor circuit art, Q0 and Q1 form a Darlington connected amplifier circuit, since, the collectors of Q0 and Q1 are commonly connected to R8 and the emitter of Q0 is connected to the base of Q1. The emitter of Q1 is connected to the indicator 14. In operation, C1 charges to a maximum, or peak, value determined by the output of OA1 and at a rate determined by R8 and C1. When the output of OA1 goes to zero, C1 discharges to ground through Q0,Q1,Q2 and R9. The discharge rate of C1 is slow compared to the C1 charging rate. It is this slow discharge rate of C1 that provides the peak hold feature of the circuit. The resulting output of Q1 is a peak voltage waveform, $V_p$, shown in FIG. 4, line D.

As further shown in FIG. 2, the indicator 14 comprises: a light emitting diode designated L1; an NPN transistor designated Q2; a resistor designated R9, and a constant current source designated I1. The anode of L1 is connected to the voltage supply bus, $V_{B1}$, and the cathode of L1 is connected to the collector of Q2. The emitter of Q2 is connected to ground through R9. The constant current source I1 is connected between the cathode of L1 and ground. The previously mentioned feedback resistor, R7, is connected between the emitter of Q2 and the inverting input of OA1. The output of the peak hold circuit 13 is applied to the base of Q2 which drives L1. R9 is a current limiting resistor, limiting the current flow through L1. As is well known to those skilled in the art, current flow through L1 causes L1 to emit light. As the current through L1 increases, the brightness of L1 increases proportionally. Since the current through L1, designated $i_{l1}$, is proportional to the peak voltage waveform, $V_p$, the current through L1 is logarithmically related to $V_s$. This relationship is illustrated by the inclined solid line of FIG. 5. The horizontal portion of the solid line at the left-hand side of FIG. 5 represents a "power-on" condition, in which L1 gives a low level light output indicating power has been applied to the photosensing system, however, detection of the light signal 18 has not yet occurred. The "power-on" current is supplied by the constant current source I1.

As further shown in FIG. 2, the indicator 14 further comprises: a constant current source designated I2; and NPN transistor designated Q14; and, a resistor designated R20. The constant current source I2 is connected between the cathode of L1 and the collector of Q14. The emitter of Q14 is tied directly to ground. An output from comparator 17 is applied to the base of Q14 through R20. When comparator 17 changes states (i.e. when $V_i$ exceeds $V_T$), the comparator 17 applies an output to the base of Q14. Q14 turns on and shorts I2 to ground, which increases the current flow through L1, and produces a step increase in brightness of L1.

As will be readily appreciated by those skilled in photosensing art from the foregoing description, L1 provides a light output that is logarithmically related to the strength of the light signal 18 detected by the sensor 10. Since the strength of the detected signal 18 varies linearly with the alignment of the sensor 10 and the associated phototransmitter, the output of L1 is logarithmically related to the relative alignment of the sensor 10 and the associated phototransmitter.

Figure 3:
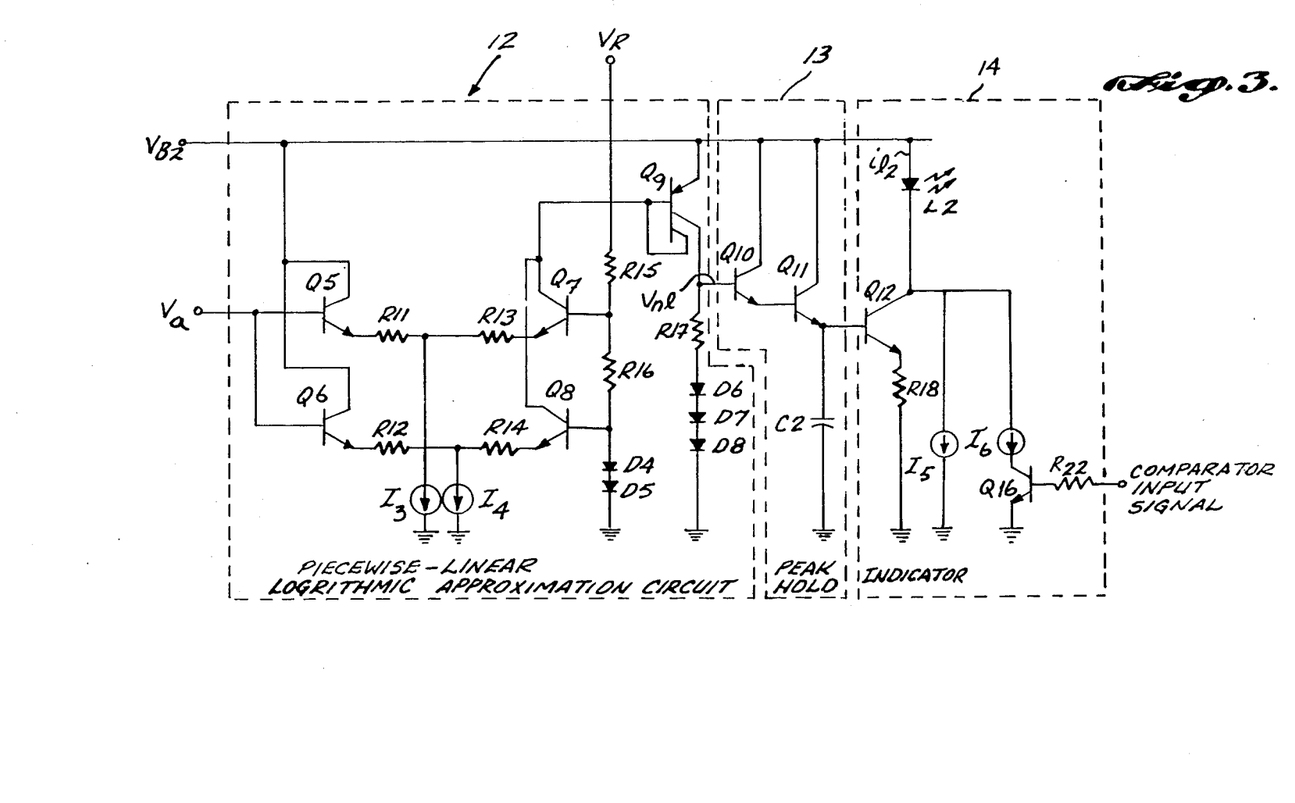
FIG. 3 is a schematic diagram of an alternative; nonlinear circuit, namely a piecewise-linear logarithmic approximation circuit, and peak hold and indicator circuits suitable for use in the embodiment of the invention depicted in FIG. 1; and, FIG. 4, lines A through G, is a series of waveforms associated with various points of the embodiments of the invention depicted in FIGS. 1, 2, and 3.

In accordance with alternative aspects of this invention, FIG. 3 represents a piecewise-linear logarithmic approximation circuit that is suitable for use as the nonlinear circuit 12 depicted in FIG. 1. FIG. 3 also depicts a peak hold 13, and indicator 14 circuits usable with the illustrated piecewise-linear approximation circuit; and, a comparator circuit 17. The piecewise-linear logarithmic approximation circuit (FIG. 3) comprises: four NPN transistors designated Q5, Q6, Q7 and Q8; one PNP transistor designated Q9; five diodes designated D4, D5, D6, D7 and D8; two constant current sources designated I3 and I4; and, seven resistors designated R11, R12, R13, R14, R15, R16, and R17. In this embodiment of the invention, $V_a$ is applied to the bases of Q5 and Q6. The collectors of Q5 and Q6 are connected to a voltage supply bus $V_{B2}$. The emitter of Q5 is connected to the emitter of Q7 through the series connection of R11 and R13. Current source I3 is connected from the node between R11 and R13 to ground. The emitter of Q6 is connected to the emitter of Q8 through the series connection of R12 and R14. Current source I4 is connected from the node between R12 and R14 to ground. The collectors of Q7 and Q8 are connected to the base of Q9. The base of Q7 is connected to the base of Q8 through R16. The base of Q7 is connected to a reference voltage, $V_R$, through R15. The base of Q8 is tied to ground through the series connection of D4 and D5. More specifically, the base of Q8 is connected to the anode of D4, the cathode of D4 is connected to the anode of D5, and the cathode of D5 goes to ground. Q9 is a four lead PNP transistor having a base lead, an emitter lead and two collector leads. The emitter of Q9 is connected to the voltage supply bus $V_{B2}$. One collector lead of Q9 is connected to the input of the peak hold circuit 13, in the manner hereinafter described, and to ground through the series connection of R17, D6, D7 and D8. More specifically, the collector of Q9 is connected to the anode of D6 through R17, the cathode of D6 is connected to the anode of D7, the cathode of D7 is connected to the anode of D8, and the cathode of D8 goes to ground. The second collector lead of Q9 is connected to the base of Q9. Q9 operates as a current mirror which causes the currents in both Q9 collector circuits to be equal.

Q5 and Q7 in combination with R11 and R13 form a differential transistor pair whose output, i.e., the Q7 collector current is controlled by the difference between the base voltages of Q5 and Q7. If $V_a$ is less than $V_R$ by the voltage drop across R15, i.e., the base voltage on Q5 is equal to the base voltage on Q7, the Q7 and Q5 collector currents will be equal. If the base voltage of Q5 is greater than the base voltage of Q7 the collector current of Q7 will be less than the collector current of Q5. If the base voltage of Q5 is less than the base voltage of Q7, the collector current of Q7 will be greater than the collector current of Q5. In all cases, the sum of the collector currents equal I3. Q6 and Q8 in combination with R12 and R14 form a differential transistor pair that behave in a similar manner to Q5 and Q7. The main differential transistor pairs is that the base of Q8 is held to a lower reference than is the base of Q7 as is evident by the fact that the base of Q8 is at a voltage equal to $V_R$ less the voltage drop across both R15 and R16; whereas, the base of Q7 is at a voltage equal to $V_R$ less only the voltage drop across R15. As a result, in the above example, where the voltage at the base of Q5 ($V_a$) is equal to the voltage at the base of Q7 ($V_R$ minus the voltage drop across R15), the collector current of Q6 is greater than the collector current of Q8 because the base voltage ($V_a$) of Q6 is higher than the base voltage of Q8 ($V_R$ minus the voltage drops across R15 and R16). As a result, when the amplitude of the $V_a$ pulses decreases, the collector current of Q8 increases relative to the collector current of Q6 because the base voltage of Q8 becomes closer to the base voltage of Q6. Likewise, as stated above, as the $V_a$ pulses decreases, the collector current of Q7 increases relative to the collector current of Q5. The collector currents of Q7 and Q8 are summed at the base of Q9. The relationship of changes in the summed currents to changes to the amplitude of $V_a$ pulses is controlled by the ratio of the values of R15 and R16. In accordance with the invention, the ratio of R16 to R15 is 10:1. Because of the 10:1 ratio of R16 and R15, and since the collector currents of Q7 and Q8 are both applied to the base of Q9, the resulting base current of Q9 varies with the $V_a$ pulses in a nonlinear manner. More specifically, because of the 10:1 relation between the change in collector current of Q7 and Q8 relative to the change in the Q5 and Q6 collector current, the base current of Q9 is related to the $V_a$ pulses in an approximately logarithmic manner. Q9 is connected as a current mirror, so that the first collector current of Q9 is the same as the sum of its base and second collector currents (i.e., the same as the combined value of Q7 and Q8 collector currents). The collector current of Q9 creates a related voltage drop across R17 resulting in the compressed pulses, $V_{nl}$, being approximately logarithmically related to the $V_a$ pulses, as illustrated in FIG. 4, line C.

The peak hold circuit 13 represented in FIG. 3 includes: two NPN transistors designated Q10 and Q11; and a capacitor designated C2. As previously discussed, one collector of Q9 is connected to the base of Q10. The emitter of Q10 is connected to the base of Q11. The collectors of both Q10 and Q11 are connected to the voltage supply bus, $V_{B2}$. Thus, Q10 and Q11 form a Darlington amplifier circuit. The emitter of Q11 is connected to the indicator 14, and further to ground through capacitor C2. C2 charges to a value determined by the voltage across R17. When Q11 is turned off as a result of the Q9 collector current going to zero, C2 holds the charge. The resulting peak voltage waveform, $V_p$, across C2 and the base of Q12 is illustrated as $V_p$ in FIG. 4, line D.

The indicator 14 represented in FIG. 3 includes: one NPN transistor designated Q12; one LED designated L2; one resistor, designated R18; and, a constant current source designated I5. The base of Q12 is connected to the emitter of Q11 in the peak hold circuit 13. Q12 drives the LED, L2. More particularly, the collector of Q12 is connected to the cathode of L2 and to ground through the constant current source I5. The anode of L2 is connected to the voltage supply bus $V_{B2}$. The emitter of Q12 is connected to ground through R18.

The output from the peak hold circuit 13, $V_p$, is applied to the base of Q12, which controls the amount of current flow through L2, and thereby controls the light output of L2. The current flow through L2, designated $i_{l2}$, is represented by the dashed line in FIG. 5. The left side of the curve represents the "power on" condition similar to that discussed above with the logarithmic amplifier circuit. The "power on" current is supplied by the constant current source I5.

As further shown in FIG. 3, the indicator 14 further comprises: a constant current source designated I6; an NPN transistor designated Q16; and, a resistor designated R22. The constant current source 16 is connected between the cathode of L2 and the collector of Q16. The emitter of Q16 is tied directly to ground. An output from comparator 17 is applied to the base of Q16 through R22. When comparator 17 changes states (i.e., when $V_i$ exceeds $V_T$), the comparator 17 applies an output to the base of Q16. Q16 turns on and shorts I2 to ground, which increases the current flow through I2 and produces a step increase in brightness of L2.

Hence, as is obvious from the foregoing description, L2 provides a light output that approximates a logarithmic relationship with the detected light signal 18.

As will be appreciated from the foregoing description, the invention provides an apparatus for aligning photosensing systems. The nonlinear circuit 12 produces a series of compressed pulses $V_{nl}$, that are nonlinearly proportional to the amplitudes of the electrical pulses, $V_s$, which are produced by the sensor 10 when the sensor senses a modulated light signal 18. The peak values of $V_{nl}$, represented by the waveform $V_p$ control the current flow, $i_{l1}$ and $i_{l2}$, through the indicator 14. A threshold detection loop provides a step increase in the brightness of the indicator upon initial detection of the light signal 18. Hence, the invention provides an apparatus for visually indicating the strength of the signal received by sensor 10, which is related to the relative alignment of sensor 10 and the associated phototransmitter. The compressed pulse waveform, $V_{nl}$, allows the indicator to respond to a broader range of inputs than is possible in a system where an indicator responds linearly to the strength of a modulated light signal. Furthermore, the invention offers simplicity and cost effectiveness by utilizing only one indicator to indicate alignment of the photosensing system, whereas, other systems use multiple indicators. The invention also avoids the confusion generated by systems employing blinking indicators.

While a preferred embodiment of the invention has been illustrated and described, it will be appreciated that various changes can be made therein. For example, the logarithmic amplifier form of the nonlinear circuit 12 can be formed on a chip, or integrated circuit, rather than by the illustrated discrete component method. Also, it is to be understood that other forms of piecewise-linear logarithmic approximation and other nonlinear circuits, such as square root circuits, can be used to nonlinearly compress the amplitude of the sensor pulses. Consequently, the invention can be practiced otherwise than specifically described herein.

The embodiments of the invention in which an exclusive property or privilege is claimed are defined as follows:

1. A photoelectric compressed analog signal strength alignment indicator comprising:
   sensing means for receiving a light signal produced by an associated light transmitting means and producing an electrical signal proportional to said light signal;

signal compressing means, coupled to said sensing means, for receiving said electrical signal produced by said sensing means and nonlinearly compressing the amplitude of said electrical signal;

visual alignment indicating means, coupled to said signal compressing means, for receiving said nonlinearly amplitude compressed electrical signal and producing a visual alignment indicating signal whose brightness is proportional to the magnitude of said nonlinearly amplitude compressed electrical signal; and, threshold means, coupled to said sensing means and to said visual indicating means for receiving said electrical signal produced by said sensing means, producing a threshold signal when the magnitude of said electrical signal exceeds a predetermined value and applying said threshold signal to said indicating means.

2. The photoelectric compressed analog signal strength alignment indicator claimed in claim 1, wherein said light signal received by said sensing means is modulated light signal and wherein said threshold means comprises:

a demodulator coupled to receive said electrical signal produced by said sensing means and produce a demodulated electrical signal;

an integrator coupled to said demodulator to receive said demodulated electrical signal and produce an integrated signal proportional to said electrical signal produced by said sensing means; and, a comparator, coupled to said integrator to receive said integrated signal, compare said integrated signal to a predetermined threshold value and produce said threshold signal when said integrated signal exceeds said predetermined threshold value, such that said threshold signal causes a step increase in the brightness of said visual alignment indicating signal when said light signal is first detected by said sensing means.

3. The photoelectric compressed analog signal strength alignment indicator as claimed in claims 1 and 2, wherein said signal compressing means comprising a logarithmic amplifier.

4. The photoelectric compressed analog signal strength alignment indicator as claimed in claims 1 or 2, wherein said signal compressing means comprises a piecewise-linear logarithmic approximation circuit.

5. The photoelectric compressed analog signal strength alignment indicator as claimed in claims 1 or 2, wherein said sensing means is a photodetector.

6. The photoelectric compressed analog signal strength alignment indicator as claimed in claim 1 or 2, wherein said visual indicating means is a light emitting diode (LED).

7. The photoelectric compressed analog signal strength alignment indicator claimed in claim 6, wherein said light emitting diode is a single light emitting diode.

8. A photoelectric compressed analog signal strength alignment indicator comprising:

(a) a photodetector for receiving a modulated light signal produced by an associated photoelectric transmitter and producing a modulated electrical signal whose magnitude is proportional to the magnitude of said received light signal;

(b) a nonlinear amplifying means connected to said photodetector for receiving said electrical produced by said photodetector and nonlinearly compressing said electrical signal;

(c) a light emitting diode connected to said nonlinear amplifying means for receiving said nonlinearly compressed electrical signal and producing a light signal whose brightness is proportional to said nonlinearly compressed electrical signal; and (d) a threshold loop comprising:

(i) a demodulator connected to said photodetector for receiving said modulated electrical signal produced by said photodetector, demodulating said modulated electrical signal and producing a demodulated electrical signal;

(ii) an integrator connected to said demodulator for receiving said demodulated electrical signal, integrating said demodulated electrical signal and producing an integrated signal proportional to said modulated electrical signal produced by said photodetector; and (iii) a comparator connected to said integrator and to said light emitting diode for receiving said integrated signal, comparing said integrated signal to a predetermined threshold value, producing a threshold signal when said integrated signal exceeds said predetermined threshold value and applying said threshold signal to said light emitting diode, such that said threshold signal causes a step increase in the brightness of said light signal produced by said light emitting diode when said modulated light signal is first detected by said photodetector.

9. The photoelectric compressed analog signal strength alignment indicator claimed in claim 8, wherein said nonlinear amplifying means comprises:

(a) a nonlinear amplifying circuit connected to said photodectector for receiving said electrical signal produced by said photodetector and nonlinearly compressing said electrical signal; and (b) a peak hold circuit connected to said nonlinear amplifying circuit for receiving said nonlinearly compressed electrical signal, holding peak values of said nonlinearly compressed electrical signal and supplying said peak values of said nonlinearly compressed electrical signal to said light emitting diode.

10. The photoelectric compressed analog signal strength alignment indicator claimed in claim 9, wherein said nonlinear amplifying circuit is a logarithmic amplifier.

11. The photoelectric compressed analog signal strength alignment indicator claimed in claim 9, wherein said nonlinear amplifying circuit is a piecewise-linear logarithmic approximation circuit.

12. The photoelectric compressed analog signal strength alignment indicator claimed in claim 9, wherein said light emitting diode is a single light emitting diode.

13. In a photoelectric alignment indicating system comprising a sensing means for receiving a modulated light signal produced by an associated light transmitting means and producing an electrical signal proportional to said modulated light signal and, a visual indicating means, coupled to said sensing means, for receiving said proportional electrical signal and producing a visual indicating signal proportional to the magnitude of said proportional electrical signal, the improvement comprising a signal compressing means, coupled to said sensing means, for receiving said electrical signal produced by said sensing means and nonlinearly compressing the amplitude of said electrical signal and supplying said nonlinearly compressed electrical signal to said visual indicating means such that the brightness of said visual indicating signal is proportional to the magnitude of said proportional electrical signal.

14. The improved photoelectric alignment indicating system claimed in claim 13, wherein said signal compressing means comprises a logarithmic amplifier.

15. The improved photoelectric alignment indicating system claimed in claim 13, wherein said signal compressing means comprises a piecewise-linear logarithmic approximation circuit.

16. The improved photoelectric alignment indicating system claimed in claim 13, wherein said sensing means is a photodetector.

17. The improved photoelectric alignment indicating system claimed in claim 13, wherein said visual indicating means is a light emitting diode (LED).

18. The improved photoelectric alignment indicating system claimed in claim 17, wherein said light emitting diode is a single light emitting diode.

* * * * *

UNITED STATES PATENT AND TRADEMARK OFFICE
CERTIFICATE OF CORRECTION

PATENT NO. : 4,851,660

DATED : July 25, 1989

INVENTOR(S) : Scott M. Juds et al.

It is certified that error appears in the above-identified patent and that said Letters Patent is hereby corrected as shown below:

```
Column 7,  line 4:   "differential" should be --difference between the--
Column 8,  line 13:  "16" should be --I6--
Column 9,  line 44:  "and" should be --or--
Column 9,  line 55:  "claim" should be --claims--
Column 10, line 2:   after "electrical" insert --signal--
```

Signed and Sealed this

Twenty-fourth Day of July, 1990

Attest:

HARRY F. MANBECK, JR.

*Attesting Officer*    *Commissioner of Patents and Trademarks*